Oct. 1, 1963    J. R. J. COTTRELL    3,105,884
RECIPROCABLE ROD ACTUATED SWITCH
Filed Oct. 25, 1960    2 Sheets-Sheet 1
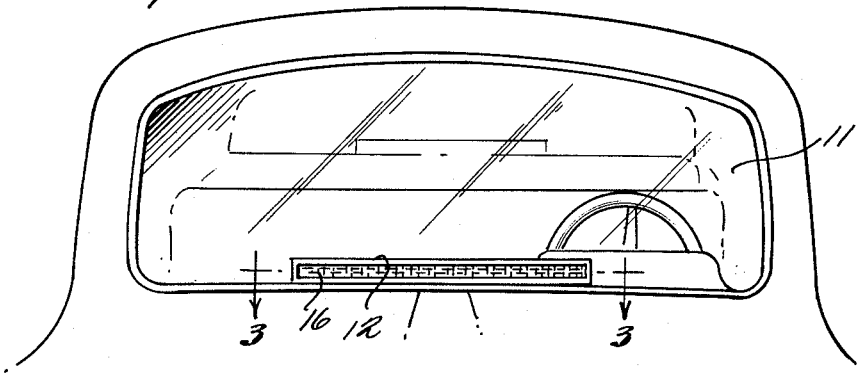
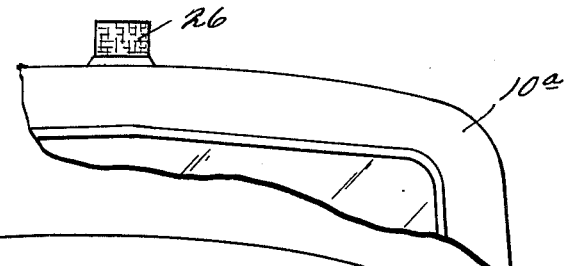
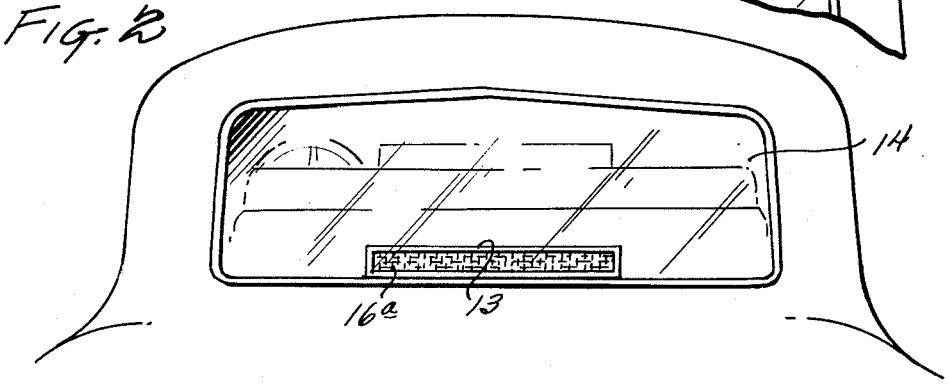
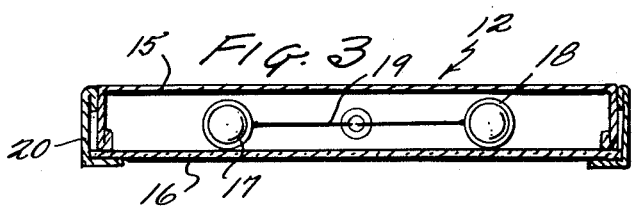
INVENTOR.
JULIUS R. J. COTTRELL
BY
Kimmel & Crowell
ATTORNEYS Oct. 1, 1963 J. R. J. COTTRELL 3,105,884
RECIPROCABLE ROD ACTUATED SWITCH
Filed Oct. 25, 1960 2 Sheets-Sheet 2
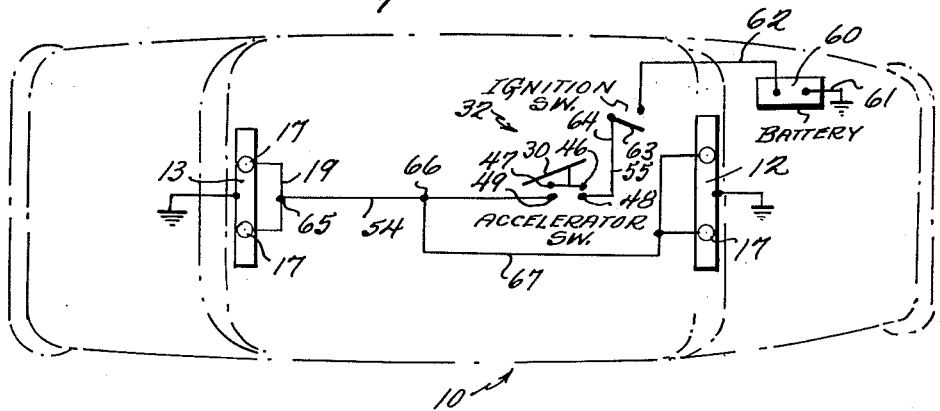
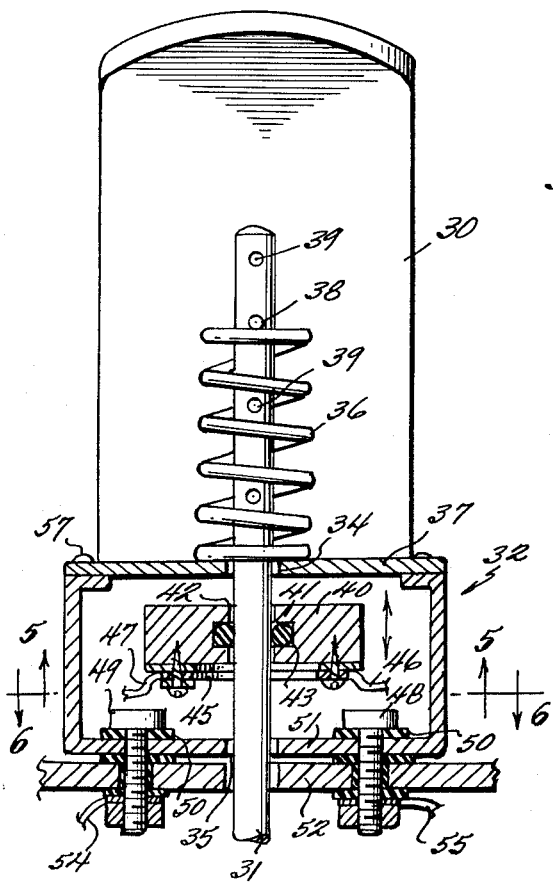
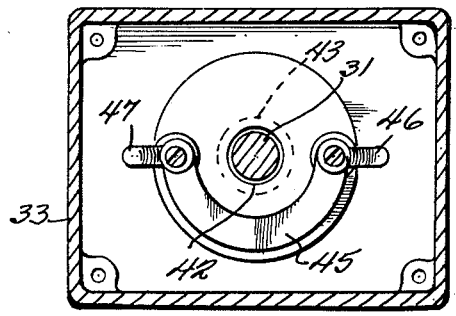
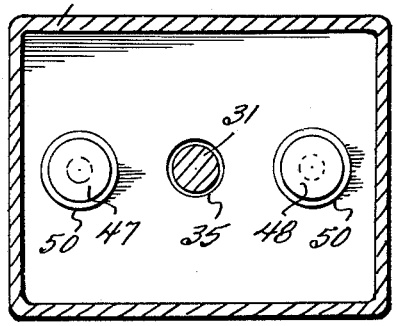
INVENTOR.
JULIUS R. J. COTTRELL
BY
Kimmel & Crowell
ATTORNEYS

United States Patent Office 3,105,884
Patented Oct. 1, 1963

3,105,884
RECIPROCABLE ROD ACTUATED SWITCH
Julius R. J. Cottrell, Box 25, East Brunswick, N.J.
Filed Oct. 25, 1960, Ser. No. 64,772
1 Claim. (Cl. 200—61.89)

This invention relates to an accelerator activated warning light for vehicles, and has as its primary object the provision of a readily visible uniquely designed warning light which is activated by foot pressure and release of foot pressure on the accelerator pedal of a vehicle.

As conducive to a clearer understanding of this invention, it may here be pointed out that many rear end accidents are occasioned by lack of adequate warning of the driver of a following vehicle that the leading vehicle is slowing or stopping. The reaction time between the initial application of the brakes by the leading car, particularly in emergencies, and in consequent application of the brake warning light is frequently insufficient to permit the driver of a following car to apply his brakes in time. An object of the present invention is, therefore, the provision of a preliminary warning light which is normally illuminated so that as long as the gas pedal is depressed the driver of the following car will know that the vehicle is proceeding at a normal rate, but upon release of pressure on the gas pedal the following driver is provided with advance warning that the leading car is either slowing or preparing to apply the brakes, and may react accordingly. This reaction time may vary from a relatively small fraction of a second to seconds, but frequently this is sufficient to avoid a rear end collision. By use of the warning light of the instant invention the driver of the following car is enabled to apply his brakes substantially simultaneously with the application of the brakes by the driver of the leading car.

An additional object of the invention is the provision of such a safety device which is particularly useful during heavy stop and go traffic conditions. It is characteristic of this form of driving that vehicles are jammed up with only a few feet separating them. Traffic is constantly starting up with sudden stopping an ever present hazard. The element of time lapse under these conditions is particularly important since even a fraction of a second prior warning may be sufficient to prevent a chain reaction pile-up of cars which frequently occurs under such conditions.

An additional important object of the invention is the provision of a warning device which will indicate to a following car the erratic driving ability of sick, nervous, sleepy or careless motor vehicle operators whose erratic tendencies would be visible to operators of nearby vehicles in the form of erratic flashing of the warning light.

An additional object of the invention is the provision of such a warning which is also applied to the front of the vehicle, and simultaneously actuated with the rear warning light, so as to serve as a warning to the drivers of vehicles in advance of the car, that the car either is slowing, or if the light remains constant not slowing, so that the driver of the other car may have an opportunity to react accordingly and stop or slow his own vehicle. This forward light is also advantageous to pedestrians who would be restrained from crossing in front of a vehicle which gives no evidence of slowing.

An additional important object of the invention is the provision of a warning light which will be operable independently of the conventional brake lights or stop lights, and hence afford some measure of protection in the event that the conventional brake lights become inoperable for any reason.

A further object of the invention is, therefore, the provision of a vehicle warning light which serves as a constant indicator to nearby vehicles or pedestrians of the condition of drive of the vehicle, that is whether it is traveling at a constant speed or accelerating, or is actually slowing either for reduction of speed or preliminary to a stop or turn, and which therefore affords an improved and enhanced safety factor allowing additional reaction time for proper control of an adjacent vehicle.

A further specific object of the invention is the provision of an improved switch mechanism controlled by the accelerator for effecting the operation of the warning lights.

A further very important object of the invention is the provision of a safety device which gives ample warning of the action of the driver under conditions of poor visibility such as heavy fog or treacherous driving conditions such as icy roads.

Still other objects reside in the combinations of elements, arrangements of parts, and features of construction, all as will be more fully pointed out hereinafter and disclosed in the accompanying drawings wherein there are shown preferred embodiments of this inventive concept.

In the drawings:

FIGURE 1 is a fragmentary front elevational view of a motor vehicle disclosing one form of warning light incorporating features of the instant invention in position thereon.

FIGURE 2 is a similar fragmentary view showing the warning light of the instant invention positioned in the rear window of the article.

FIGURE 3 is an enlarged sectional view taken substantially along the line 3—3 of FIG. 1 as viewed in the direction indicated by the arrows.

FIGURE 4 is an enlarged vertical sectional view of one form of switch mechanism particularly adapted for use with the warning light of the instant invention and controlled by movement of the accelerator.

FIGURE 5 is a sectional view taken substantially along the lines 5—5 of FIG. 4 as viewed in the direction indicated by the arrows.

FIGURE 6 is a sectional view taken substantially along the line 6—6 of FIG. 4 as viewed in the direction indicated by the arrows.

FIGURE 7 is a schematic wiring diagram showing the connection of the switch and warning lights of the instant invention; and FIGURE 8 is a fragmentary rear elevational view of a motor vehicle incorporating the warning light of the instant invention in a different position.

Similar reference characters refer to similar parts throughout the several views of the drawings.

Having reference now to the drawings in detail, there is generally indicated at 10 a motor vehicle, which may be a pleasure car, a light truck, or a heavy truck trailer or other motor vehicle accustomed to travel on heavily traveled roadways.

In the illustrative embodiment the vehicle is shown as a conventional automobile having a windshield 11 and one of the warning lights of the instant invention is generally indicated at 12 positioned along the lower edge of the windshield, in such position as to be readily visible to pedestrians or other vehicles approaching the vehicle carrying the device, but not in a position to impede the driver's vision.

The rear warning signal 13 is substantially identical with the signal 12, and is preferably positioned along the lower surface of the rear window 14 of the vehicle as, for example, along the ledge which conventionally underlies such a rear window.

The light of the instant invention is best shown in FIG. 3 and preferably comprises an elongated housing 15, having an open face within which is positioned a panel of amber or yellow glass 16. Suitable bulbs 17 are positioned in sockets 18 at spaced intervals along the length of the housing 15, and supplied with current through wires 19, in a manner to be more fully described hereinafter. The housing is provided with a removable cover 20 which permits the removal of the glass 16 to permit replacement of the bulbs or repairs. A plurality of bulbs are illustrated for the purpose of illuminating the full length of the warning sign, although a fluorescent bulb may be employed if desired. A plurality of individual bulbs are preferable, so that in the event of a single bulb failure the device will not be rendered inoperative.

The device is preferably rectangular and elongated so as readily to contrast it from the conventional round or oval stop lights, or back-up lights, and the color is always amber or yellow which is universally recognized as a warning or caution signal.

The rear warning light 13 is substantially identical in construction to that previously described, and includes a translucent amber or yellow panel 16a, the other components being identical to that previously described.

A slightly modified form of construction is shown in FIG. 8 wherein a housing 25 is positioned on the roof of a motor vehicle, preferably at the center of the front and rear thereof as indicated, which carries an enclosure 26 of amber or yellow glass, which is again preferably rectangular in form for the reasons previously described, and which contains a suitable bulb or bulbs which is illuminated in the same manner as the bulbs 17, which will be more fully described hereinafter.

The vehicle 10 includes a conventional accelerator pedal 30, which includes a throttle control rod 31, which actuates a switch mechanism generally indicated at 32. The switch mechanism 32 comprises a housing 33, which is provided with suitable aligned top and bottom openings 34 and 35 through which the rod 31 passes. A spring 36 surrounds rod 31 between the top 37 of housing 33, and a suitable pin 38 which is seated in a selected one of a series of openings 39 in the rod 31 so that the tension of the spring may be suitably varied. The spring normally serves to bias the accelerator pedal 30 in operative position in a known manner. A block of insulating material 40 surrounds the throttle control rod 31 interiorly of the housing 33, and includes an annular channel 41 surrounding a central bore 42, in which channel is positioned a "Neophrene" or similar washer 43. The arrangement is such and the material of the washer is such that normal frictional engagement of the washer causes the block 40 to move with the control rod 31, such movement being limited by the top 37 of the housing 33. The underside of block 40 has secured thereto a contact bar 45, on the opposite ends of which are contacts 46 and 47. Contacts 46 and 47 are adapted to engage opposed fixed contacts 48 and 49 which are suitably insulated by bushings 50 from both the bottom 51 of housing 33 and the floor 52 of the vehicle. Contacts 48 and 49 are connected respectively to wires 53 and 54, the arrangement being such that when the accelerator pedal is pushed down a circuit is bridged between the wires 55 and 54, which, in a manner to be more fully pointed out hereinafter, serves to close the circuit to the warning lights 12 and 13. Promptly upon release of the pressure on the accelerator pedal, however, the contact is broken by the upward movement of block 40 and its associated contacts 46 and 47, the block being clampingly engaged to rod 31 by means of ring or washer 43. Thus the circuit is established only when pressure is maintained on the accelerator pedal 30, any slackening of speed resulting in the breaking of the circuit, and the deactivation of warning lights 12 and 13.

It may here be pointed out that cover 37 of receptacle 33 is removable, and is held in position by means of screws 57, means thus being provided permitting access to the interior of the housing or receptacle 33 for repair or other purposes.

Referring now to FIG. 7, the battery of the vehicle generally indicated at 60 is grounded in the usual manner at 61 and connected to a wire 62 which extends through the ignition switch 63. From the switch 63 a wire 64 extends to the accelerator control switch assembly 32, the contacts 48 and 49 being bridged by the accelerator activated contact bridge 46 and 47. When the circuit between contacts 48 and 49 is closed a circuit is established between wire 55 and wire 54. Wire 54 extends to a connection 65 with the wires 19 of rear signal 13, and from a terminal 66 through a wire 67 to the wires 19 of front warning light 12. It will thus be seen that as long as the accelerator pressure on panel 30 remains constant, both the front and rear warning lights which, as previously pointed out, are amber or yellow and are of rectangular configuration, will be continuously illuminated. However, any slackening in the speed of the vehicle occasioned by a removal of foot pressure from the accelerator will cause the lights to go out, thus visually indicating to persons in vehicles both ahead of and behind the vehicle carrying the signal that some change in forward progress is contemplated, thus giving adequate advance warning of sudden stops, the continued illumination of the lights also indicating continued progress and permitting other vehicles to govern their conduct accordingly.

It will thus be seen that there is herein provided a warning light and a control means therefor which accomplishes all the objects of this invention, and others, including many advantages of great practical utility and commercial importance.

As many embodiments may be made of this inventive concept, and as many modifications may be made in the embodiments hereinbefore shown and described, it is to be understood that all matter herein is to be interpreted merely as illustrative, and not in a limiting sense.

I claim:

A circuit making and breaking device for controlling signal lights on a motor vehicle adapted to be positioned on the floor of the motor vehicle beneath the accelerator pedal, comprising a housing having a top and a bottom with aligned holes therein, a rod slidably mounted in said holes, said rod having a plurality of aligned openings therein, a pin selectively engageable in one of said openings in said rod above the top of the housing, a coil spring surrounding the rod and positioned between the top of the housing and said pin, fixed contacts mounted on the bottom of said housing on the opposite sides of said rod, an insulating block having a friction washer embedded therein frictionally surrounding said rod within the housing and linearly movable thereon, and a movable contact bar carried by the underside of said block and engageable with said fixed contacts when the rod is depressed.

References Cited in the file of this patent

UNITED STATES PATENTS

| | | |
|---|---|---|
| 2,006,690 | Blake | July 2, 1935 |
| 2,084,252 | Hallenberg | June 15, 1937 |
| 2,463,088 | Coombs | Mar. 1, 1949 |
| 2,584,292 | Rogers | Feb. 5, 1952 |
| 2,638,517 | Zarski | May 12, 1953 |
| 2,716,678 | Randol | Aug. 30, 1955 |
| 2,832,863 | Quimby | Apr. 29, 1958 |
| 2,957,161 | Daws | Oct. 18, 1960 |